United States Patent [19]

Emerson et al.

[11] 3,952,294

[45] Apr. 20, 1976

[54] SMOKE DETECTION ALARM SYSTEM

[75] Inventors: Frank W. Emerson; George J. Novacek, both of Peterborough, Canada

[73] Assignee: General Time Corporation, Thomaston, Conn.

[22] Filed: Jan. 3, 1974

[21] Appl. No.: 430,574

[30] Foreign Application Priority Data

Mar. 19, 1973 Canada ............................ 166370

[52] U.S. Cl. ............................ 340/237 S; 340/216; 340/224; 340/310 R

[51] Int. Cl.² ..................... G08B 17/10; G08B 1/08; H04M 11/04

[58] Field of Search ................ 340/237 S, 409, 224, 340/216, 288, 310; 250/381, 250/382, 384, 385, 389

[56] References Cited

UNITED STATES PATENTS

| | | | |
|---|---|---|---|
| 3,697,984 | 10/1972 | Atkinson et al. | 340/409 X |
| 3,778,796 | 12/1973 | Honda | 340/237 S |

*Primary Examiner*—John W. Caldwell
*Assistant Examiner*—Daniel Myer
*Attorney, Agent, or Firm*—Pennie & Edmonds

[57] ABSTRACT

An emergency alarm system for detecting smoke in remote areas and for transmitting an indication of detected smoke, either via communications channels already within a facility being protected or by way of telemetry to an alarm indicating device. A fault detector is also provided for indicating when any component of the system becomes defective or otherwise nonfunctional. More specifically, a plurality of smoke detectors of the ion chamber type are positioned at strategic points within a facility to be protected. When any one of the smoke detectors is appropriately activated by smoke, an output in the form of a time duration modulated ultrasonic signal is generated, which is coupled via telemetry or communications channels within the facility being protected to a responder unit which is provided at a central location. If the generated signal persists longer than a predetermined time, an alarm indicator is energized to indicate that smoke is present at one of the smoke detectors. If a fault occurs, such as when one of the smoke detectors becomes disconnected, no ultrasonic signal will be generated and transmitted over the communications channels and, accordingly, a slave timer in the responder unit will not be appropriately deactivated, thereby causing a signal which energizes a fault indicator.

8 Claims, 8 Drawing Figures

FIG. 1 EMERGENCY ALARM SYSTEM

SMOKE DETECTOR

FIG. 3 RECEIVER

RESPONDER UNIT

WIRELESS RECEIVER

FIG. 7 WIRED SYSTEM FUNCTION
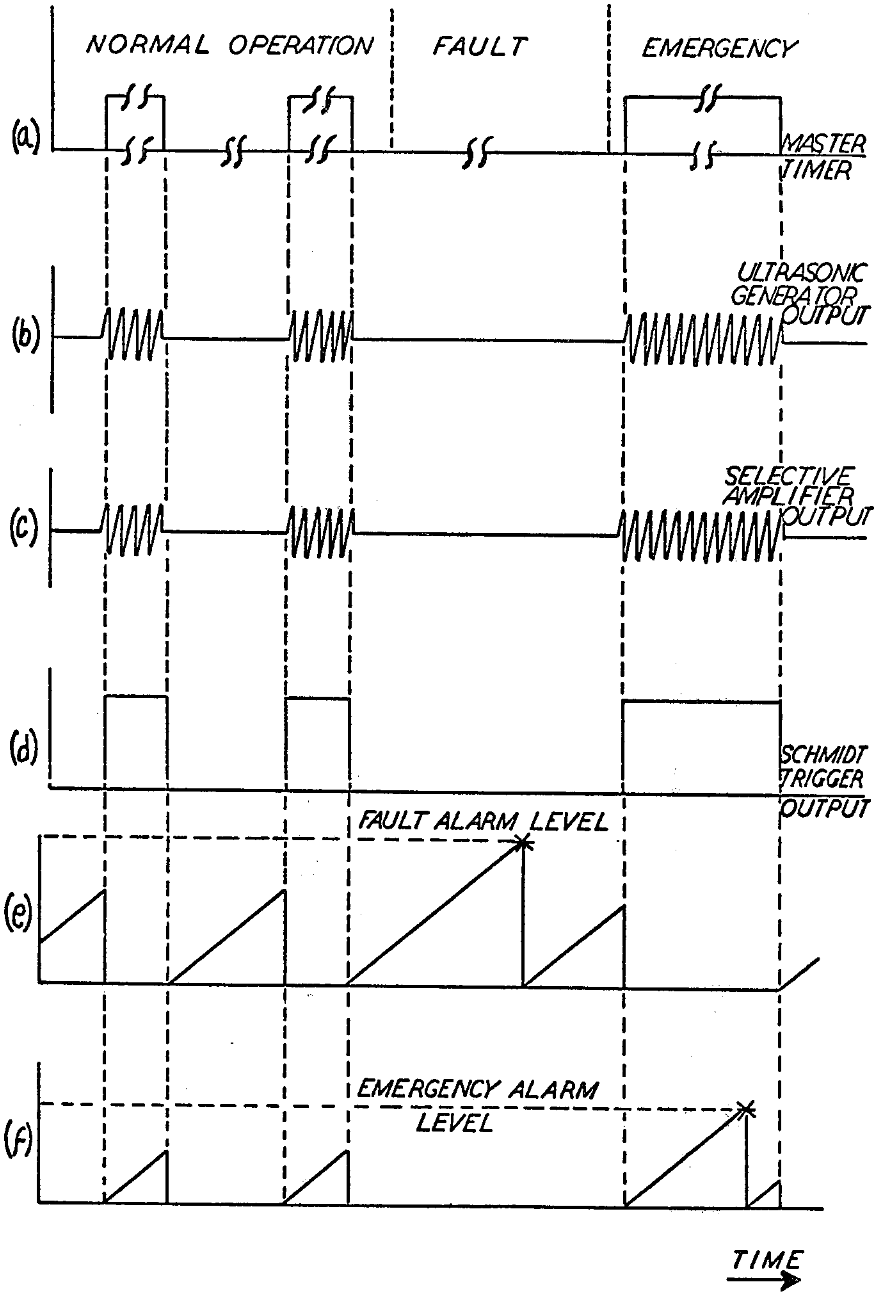

FIG. 8 WIRELESS SYSTEM FUNCTION
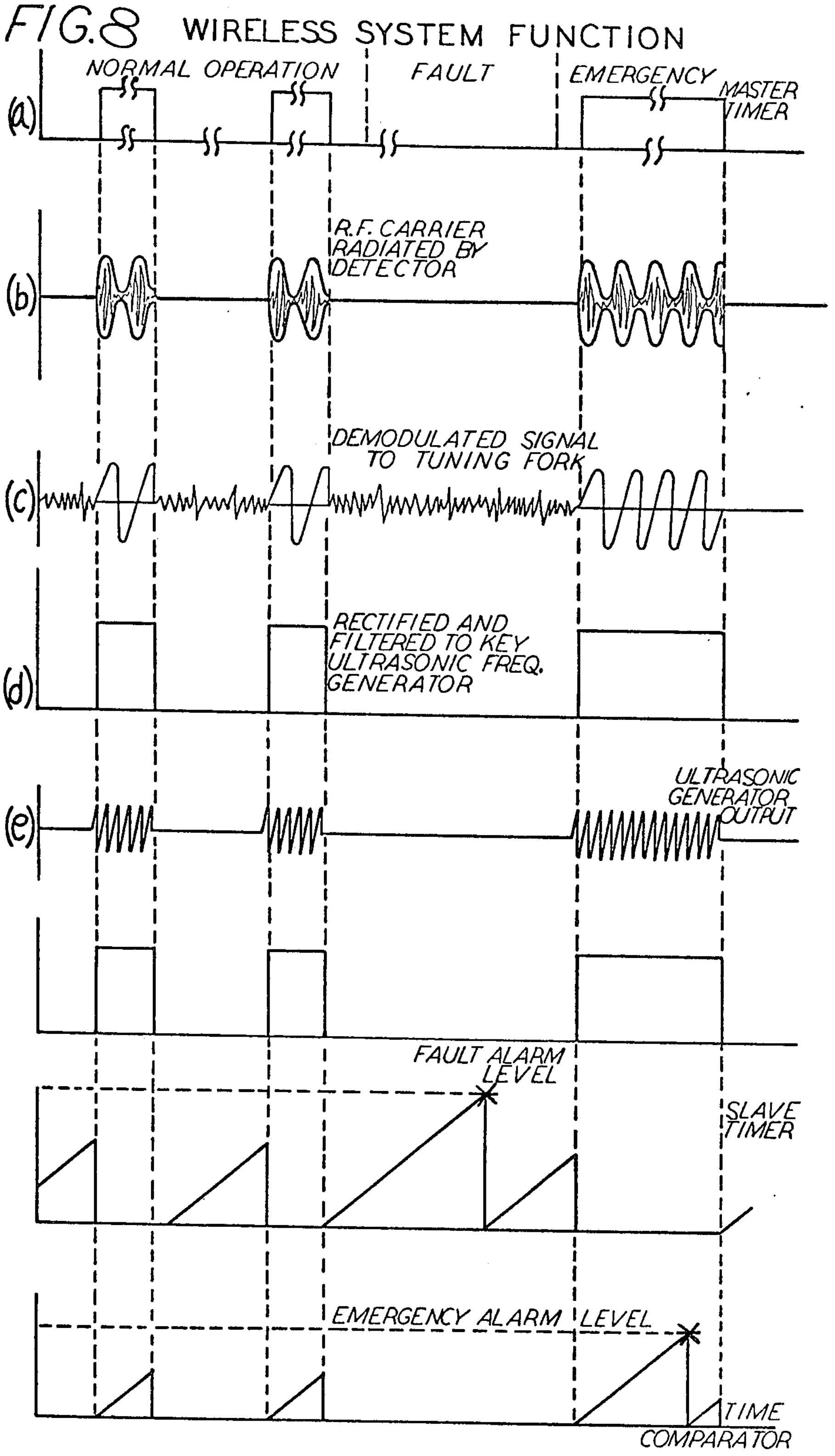

SMOKE DETECTION ALARM SYSTEM

BACKGROUND OF THE INVENTION

This invention relates to an emergency alarm system which utilizes one or more ion chamber smoke detectors for indicating the presence of smoke within a protected facility.

The present-day smoke detecting systems are typically in the form of individual units which are positioned at appropriate places throughout a building or other such facility which is to be protected. Wiring specifically for the alarm system is required which is oftentimes consuming and expensive. Such wiring often necessitates the partial remodeling of the building being protected. The present invention permits a building owner to use existing telephone wiring or other communications channels or power lines to carry alarm signals. Further, if communications channels are not already present within the facility being protected, a telemetry system is provided which generates radio signals which can be transmitted from the smoke detector to a centralized responder unit so that immediate detection of a potential fire can be effected. An important feature of the subject invention is a continuous testing system wherein periodic signals of predetermined time duration are transmitted from the individual smoke detector units to the central responder unit via the communications lines or radio waves. When an individual smoke detector undergoes a fault condition, the test signals are interrupted, thereby causing a slave timer at the responder unit to generate a signal which energizes a fault indicator. Accordingly, by the smoke detector system of the present invention, a fail-safe detector unit is provided for measuring and detecting smoke emissions within a facility being protected.

SHORT STATEMENT OF THE INVENTION

This invention relates to an emergency alarm system comprising one or more smoke detectors, the output of which modulates the time duration of an ultrasonic signal having a predetermined periodicity. The ultrasonic signal is coupled to a communications channel within the facility being detected or is transmitted via telemetry to a centralized responder unit. The responder unit converts the ultrasonic signal to a square wave having a duration equal to the duration of the modulated ultrasonic signal. This square wave is coupled to both a time comparator and to a slave timer. The time comparator generates an output signal to the alarm indicator when the time duration of the square wave is greater than a predetermined period of time. The slave timer generates an output signal to the fault indicator when the square wave is inhibited.

The detector includes a pair of serially connected ion chambers having alpha-emitting radioisotopes therein. One ion chamber is a compensating chamber which is essentially isolated from pollutants, but responsive to ambient atmospheric conditions. The other ion chamber is responsive to both pollutants, such as smoke, and to atmospheric conditions. Accordingly, a detector arrangement is provided which generates an output that varies only with changes in the pollutant levels surrounding the detectors.

BRIEF DESCRIPTION OF THE DRAWINGS

Other objects, features, and advantages of this invention will become more fully apparent from the following detailed description, appended claims, and the accompanying drawings in which:

FIG. 7 is a series of graphical displays of the various wave forms generated by the emergency alarm system of this invention; and FIG. 8 is a series of graphical displays of the wave forms generated by the emergency alarm system of the alternate embodiment.

DETAILED DESCRIPTION

Figure 1:
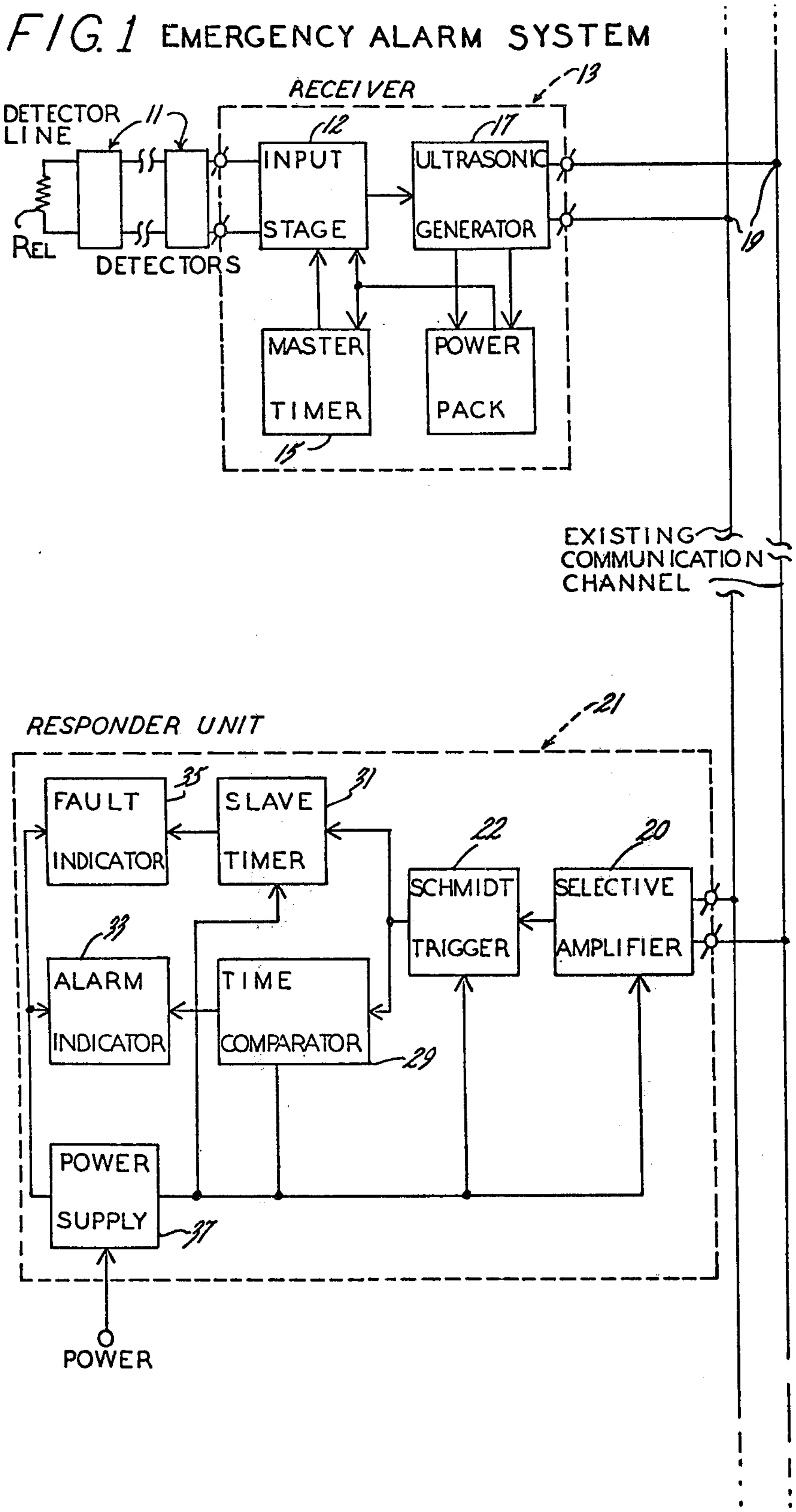
FIG. 1 is a schematic block diagram of the emergency alarm system.

Refer now to FIG. 1 where there is shown a schematic block diagram of the emergency alarm system of this invention. A plurality of smoke detectors 11 are shown connected in parallel across an end of line resistor $R_{EL}$. The lines connecting the detectors are shown broken so as to schematically illustrate that as many detectors as necessary or desired may be connected in parallel. Each of the detectors is coupled directly to the input stage 12 of a receiver unit 13. As will be seen, the input stage modulates the output of a master timer 15 so that the time duration during which a generator 17 generates an ultrasonic signal is varied depending on the condition of the detectors 11. The output of the ultrasonic generator is normally in the form of signal bursts as shown in FIG. *7b* having a constant duration and periodicity under conditions of no smoke detection. If, however, smoke is detected by one of the detectors 11, the master timer is controlled by the input stage 12 to continuously drive the ultrasonic generator 17 so that a constant ultrasonic signal is thereby generated. The ultrasonic signal is coupled to an appropriate communications channel 19. If, on the other hand, a fault, such as a break in the line connecting the detectors occurs, the master timer output is inhibited thereby preventing the ultrasonic generator 17 from generating the periodic signal which it provides under normal operation conditions. Accordingly, no signal is transmitted to the communications channel 19 until the fault is cleared. The communications channel 19 may be a telephone line, an electric power line, or a special purpose communications line installed within the facility being protected. In addition, as will be seen hereinbelow, the communications channel may be a wireless telemetry system.

The signal transmitted over the communications channel is received in a responder unit 21 which may be appropriately located in a control center. The input to the responder unit is amplified in a selective amplifier 20 which is sensitive only to the frequency of the ultrasonic generator. This selective amplification is accomplished by appropriately filtering the input signal by means of a bandpass filter. The output of the selective amplifier is converted to a square wave signal by means of a Schmidt trigger 22. The duration of the square wave generated by the Schmidt trigger depends on the duration of the signal generated by the ultrasonic signal generator 17. The output of the Schmidt trigger is coupled to both a time comparator 29 and a slave timing circuit 31. The time comparator generates a linear ramp function at the leading edge of the square wave signal form from the Schmidt trigger and is terminated at the trailing edge thereof. Thus, if the ultrasonic signal generated by generator 17 is long, i.e., smoke is detected, the ramp function generated by comparator 29 will rise to a predetermined alarm level. When this occurs, the alarm indicator 33 is energized.

The slave timer 31 generates a ramp function at the trailing edge of the signal generated by the Schmidt trigger. Thus, if a succeeding signal is not generated by ultrasonic generator 17 for a relatively long period of time, the ramp function generated by the slave timer will rise to a predetermined fault alarm level. When this occurs, a signal is generated which energizies the fault indicator 35, which provides a suitable alarm indicating that the emergency alarm detector of this invention is not properly operating. A power supply 37 is provided for supplying the necessary power to the fault and indicators 35 and alarm 33, respectively. The power may be supplied by means of a battery or may be provided by a typical AC power outlet.

Figure 2:
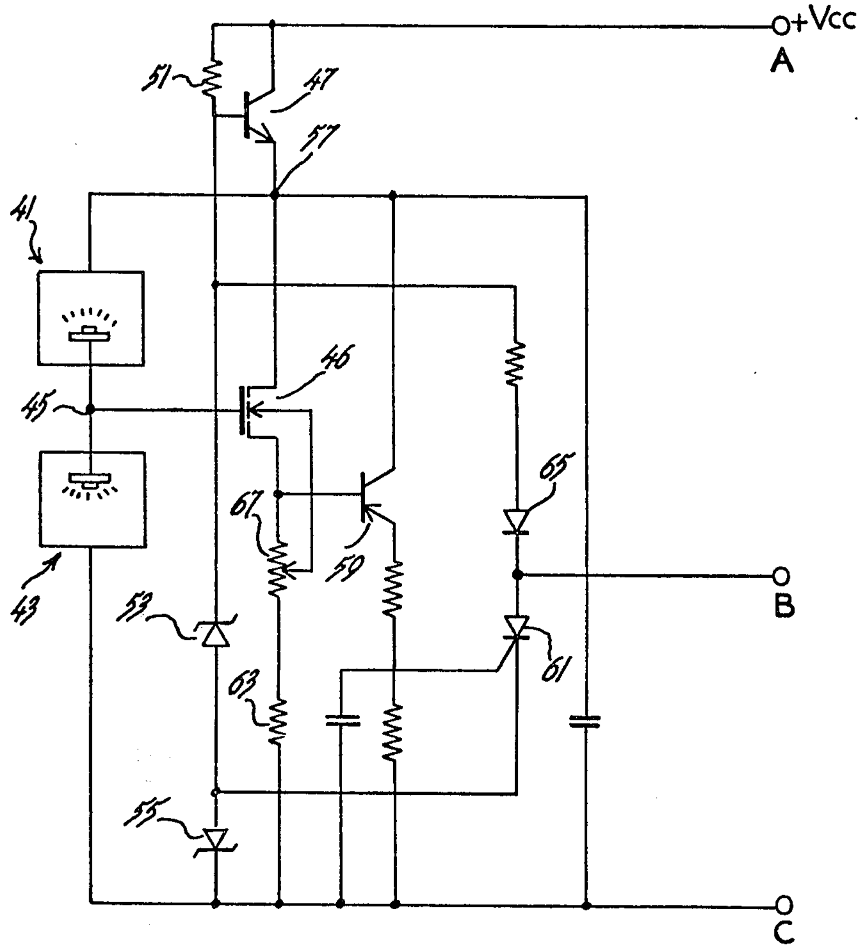
FIG. 2 is a schematic diagram of the smoke detector.

Refer now to FIG. 2 which is a schematic illustration of the detectors 11 shown in FIG. 1. A pair of ion chamber detectors 41 and 43 are connected in series as schematically illustrated. The ion chambers each contain an alpha particle emitting, radioactive substance strip which ionizes the gaseous medium within the chamber. At opposite ends of the chamber are electrodes for conducting current through the ionized medium within the chamber. Sensing chamber 43 is fully open to the atmosphere and the resistance between its electrodes is, accordingly, related to the smoke density therein. The reference chamber 41, however, is virtually closed to relatively rapidly changing ambient conditions, and its resistance is, therefore, substantially constant. The internal resistance of the chambers, however, depends not only on the smoke density but also on other atmospheric conditions, such as humidity and atmospheric pressure. Since the rise of the smoke density due to a fire is relatively fast with respect to these other atmospheric conditions, the reference chamber is utilized to compensate the other more slowly varying conditions. Thus, the reference chamber has one small opening therein covered with a cloth which does not allow the smoke to penetrate therethrough but is permeable to the effects of humidity, barometric pressure, etc. Accordingly, as atmospheric conditions change, the effects thereof on both the reference chamber 41 and the sensing chamber 43 are proportional.

The serial arrangement of the two chambers provides a voltage divider with a dividing ratio of 1:1. Therefore, the output voltage at point 45 is one-half the total voltage appearing across the two chambers. In the preferred embodiment, the chambers are designed such that a very small amount of smoke on the order, for example, of 0.001 grams/cubic inch will result in an imbalance of the divider of approximately 10 percent. In order to obtain good sensitivity and stability of the detector, the common output terminal 45 of the reference and sensing chambers must not be loaded. To insure this, a hybrid combination of an N-channel enhancement mode MOS-FET transistor 46 and an NPN transistor 59 is provided. This combination provides an extremely high input impedance on the order of $10^{14}$ ohms, very low output impedance, and a voltage gain of almost unity above threshold level.

Resistor 51, together with the zener diode 53, and forward biased zener diode 55 provide a reference voltage for the base of transistor 47 and for the cathode terminal of silicon controlled rectifier 61. Transistor 47 acts as a voltage stabilizer and provides constant voltages to the ionization chambers 41 and 43 via terminal 57 thereof. This voltage stabilizer permits the detector to operate over a range of supply voltages from ten to twenty volts which, as can be seen, increases the versatility of the detector system of this invention.

With no smoke in the sensing chamber, the gate to source voltage of the MOS-FET is lower than the threshold voltage for initiating conduction therein. Hence, no current flows from the drain to the source and, consequently, the collector currents of transistors 46, 47, 59 and 61 are virtually zero. When smoke causes the conduction of the sensing chamber 43 to decrease, the gate voltage of the transistor 46 approaches a threshold value designated $V_{gs}$(TH), thereby initiating a small current flow from the emitter of transistor 47 through drain to source channel of the transistor 46, resistors 67 and 63 and base-to-emitter junction of transistor 59. The collector-to-emitter current of transistor 59 then begins to drive silicon controlled rectifier 61 into an "on" state and, accordingly, the anode voltage of transistor 61 decreases thereby permitting more current to flow through resistor 51 and diode 65. This starts an avalanche process, wherein the transistors 46 and 61 become fully conductive. The silicon controlled rectifier 61 is operated such that its cathode is reverse biased via diode 55 and its anode current is kept below its holding current level. Thus, the action of the SCR 61 is similar to the characteristics of a Schmidt trigger with the advantage that no current is drawn in the off state.

The sensitivity adjustment for varying the threshold detecting level of smoke density is accomplished by varying the substrate potential of the MOS transistor 46, which is dependant on the position of the tap of potentiometer 67 which is connected to the substrate of MOS transistor 46.

The detector operates as an ajustable voltage sensitive Schmidt trigger with extremely high input impedance, low output impedance, fast rise and fall times and hysteresis.

The circuit as presented in FIG. 1 does not remain latched in the alarm following the clearance of smoke. The circuit can be made to latch by connecting a load between terminals A and B large enough to ensure an anode current larger than the holding current of SCR 61. The load could be typically a relay or lamp. The detector in the case of the latching form performs as a voltage sensitive bi-stable flip-flop with an extremely high input impedance and fast rise time. The detector remains locked in the alarm state until the supply current is momentarily discontinued at terminals A and C at which time the circuit reverts to the non-alarm state.

Figure 3:
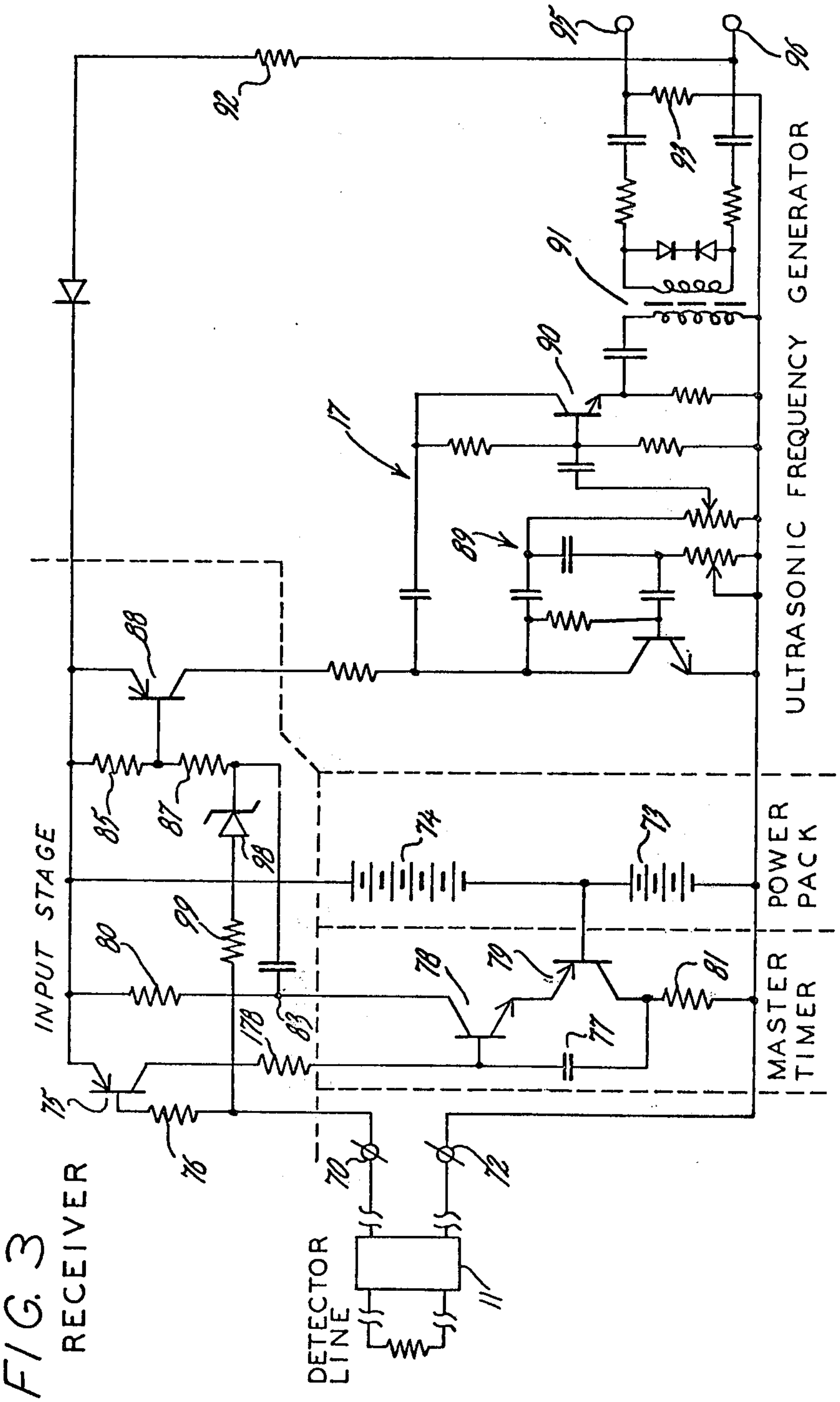
FIG. 3 is a schematic diagram of the receiver portion of the emergency alarm system illustrated in FIG. 1.

Refer now to FIG. 3, which is a schematic diagram of the receiver circuit for the smoke detector of this invention. Terminals 70 and 72 of the receiver are connected to conductors which connect load relays of one or more detectors 11 with the receiver circuit. The conductive lines connecting the detectors are terminated in an end-of-line resistor. A power supply consisting of batteries 73 and 74 provide a constant DC voltage for powering the receiver circuit. A small emitter-to-base current through transistor 75 and resistor 76 flows through the end-of-line resistor $R_{EL}$ and then to reference ground. This current maintains transistor 75 in a conductive state. The collector current of transistor 75 charges capacitor 77 via resistor 178. The capacitor 77 is a storage capacitor of the master timer unit referred to in FIG. 1 which consists of transistors 78 and 79 and resistors 80 and 81. When capacitor 77 is charged to a predetermined level, transistor 78 is turned on. With transistor 78 turned on, the voltage across the emitter-base junction of transistor 79 increases, thereby biasing transistor 79 on. Capacitor 77 then discharges through transistors 78 and 79. With transistors 78 and 79 turned on, the potential at junction 83 is decreased toward reference ground potential, thereby causing current to flow through biasing resistors 85 and 87 of transistor 88. Transistor 88 is thereby turned on, which fact causes the ultrasonic generator 17 to function. The ultrasonic generator 17 delivers an ultrasonic frequency signal over the communication channel 19 through a balancing transformer 91. Resistors 92 and 93 provide a trickle charge for the battery 74. The transmitter output terminals 95 and 96 connect to a telephone or other communication lines which connect with the responder unit 21 illustrated in FIG. 1.

If, for example, the lines connecting the detector to the receiver are broken, then current ceases to flow through transistor 75. If this occurs, no current will flow to capacitor 77 and, hence, the master timer transistors 78 and 79 would remain turned off. Because of this, transistor 88 will not turn on and, accordingly, the ultrasonic frequency generator will not generate a periodic signal at the output terminals 95 and 96 thereof. On the other hand, if smoke is detected, a short circuit is created by the conduction of the transistor 61 which causes transistor 88 to be continuously turned on since the biasing resistors 85 and 87 thereof are connected to referece ground via zener diode 98 and resistor 99. Hence, the ultrasonic frequency generator 17 will continuously generate an output signal at the terminals 95 and 96.

The signals generated in the receiver unit are illustrated graphically in FIG. 7. Referring first to FIG. 7*a*, there is shown the output of the master timer circuit 15. Under normal conditions, the master timer generates an on signal periodically for a predetermined period of time. When a fault occurs, the master timer does not generate an output signal since current will not flow from transistor 75 to the timing capacitor 77. On the other hand, when smoke is detected, transistor 88 is continuously turned on, and the output of the master timer, accordingly, is always on. FIG. 7*b* is a graphic display of the output of the ultrasonic generator 17. Under normal operation, the generator provides a high-frequency output which is periodic and has a predetermined time duration which is determined by the master timer circuit. When a fault occurs, since transistor 88 is turned off, the ultrasonic generator will not provide an output signal. On the other hand, when smoke is detected, the master timer continuously generates an output signal, thereby causing the generator to provide a continuous high-frequency output.

Figure 4:
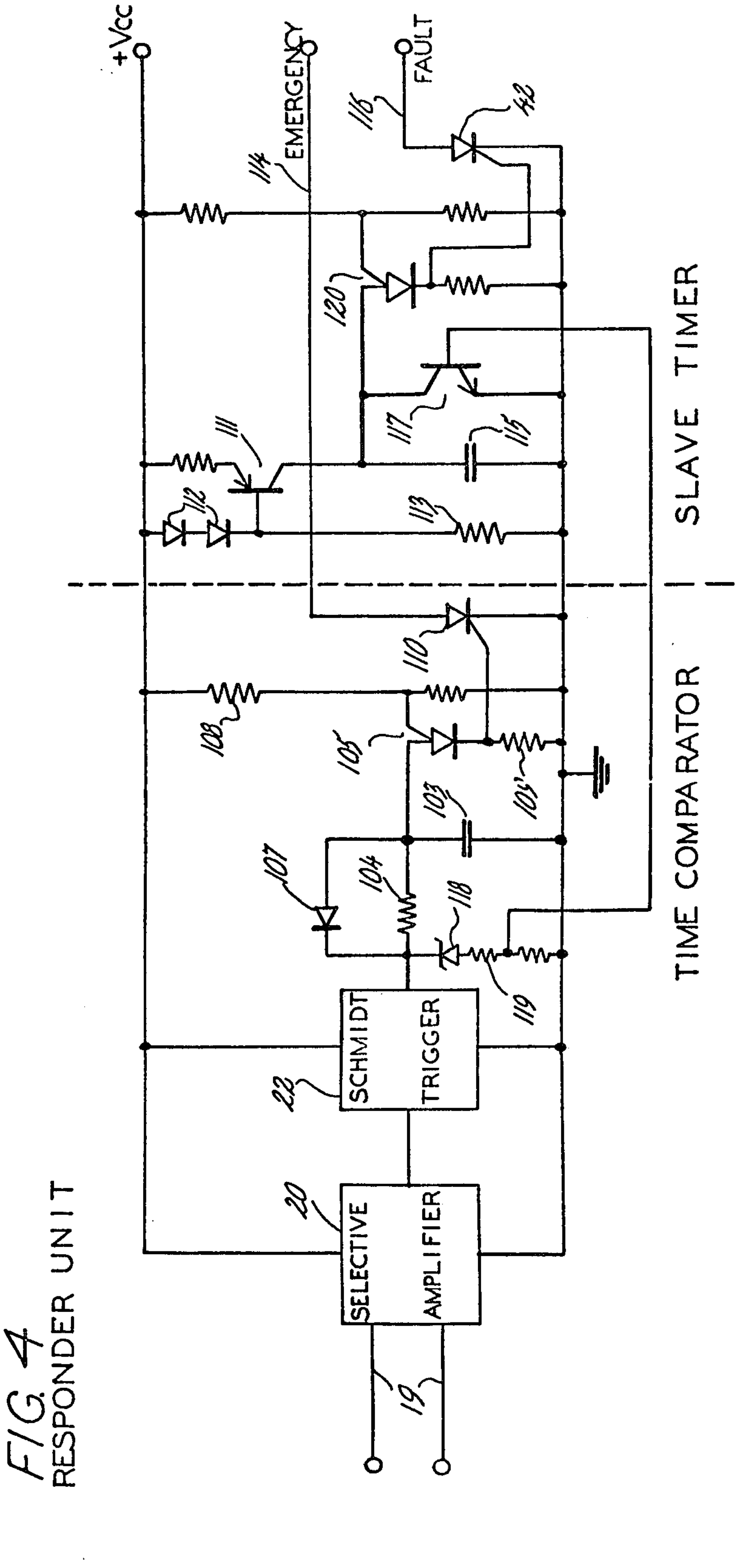
FIG. 4 is the responder unit of the emergency alarm system.

Refer now to FIG. 4, which is a schematic illustration of the responder unit of this invention. The output of the ultrasonic generator is received over communication lines 19 at the input of a selective amplifier 20. The selective amplifier amplifies only a signal having the frequency of the signal generated by the ultrasonic generator. The output of the selective amplifier is represented graphically at FIG. 7*c*. This output is coupled to a Schmidt trigger which converts the signal to a square wave having a time duration equal to the duration of the output signal of the amplifier 20. The output of the Schmidt trigger is shown graphically at FIG. 7*d*. This output is coupled to a timing capacitor 103 via a resistor 104. The voltage on the capacitor 103 then increases until either programmable uni-junction transistor 105 is turned on or until the output of the Schmidt trigger is switched to zero. If the output of the Schmidt trigger goes to zero, the capacitor 103 will discharge through diode 107. If, however, the capacitor charges to a voltage above a predetermined signal level, transistor 105 fires and thereby conducts the charge stored in capacitor 103 to resistor 109. This provides a positive biasing potential to the gate terminal of SCR 110. This causes the SCR to fire, thereby energizing an emergency alarm indicator 33, illustrated in FIG. 1, which is connected to terminal 114.

Referring now to the slave timer designated by the numeral 31, a transistor 111 is provided having a constant biasing circuit provided by the diodes 112 and resistor 113. Hence, transistor 111 provides a constant charging current to capacitor 115. Ordinarily, capacitor 115 is periodically discharged by the output of the Schmidt trigger 22 which is conveyed to key transistor 117 via zener diode 118 and resistor 119. However, if no signal appears at the output of the Schmidt trigger for a predetermined period of time, the capacitor 115 will charge above a predetermined level, thereby causing programmable uni-junction transistor 120 to be turned on. With uni-junction transistor 120 turned on, a pulse is delivered to the gate terminal of SCR 42, thereby causing SCR 42 to turn on. With SCR 42 turned on, the fault indicator circuit 35 which is illustrated in FIG. 1 is energized via terminal 116. The voltage time characteristic across the capacitor 103 is illustrated in FIG. 7*e*, and the voltage time characteristic across capacitor 115 is illustrated in FIG. 7*f*.

Figure 5:
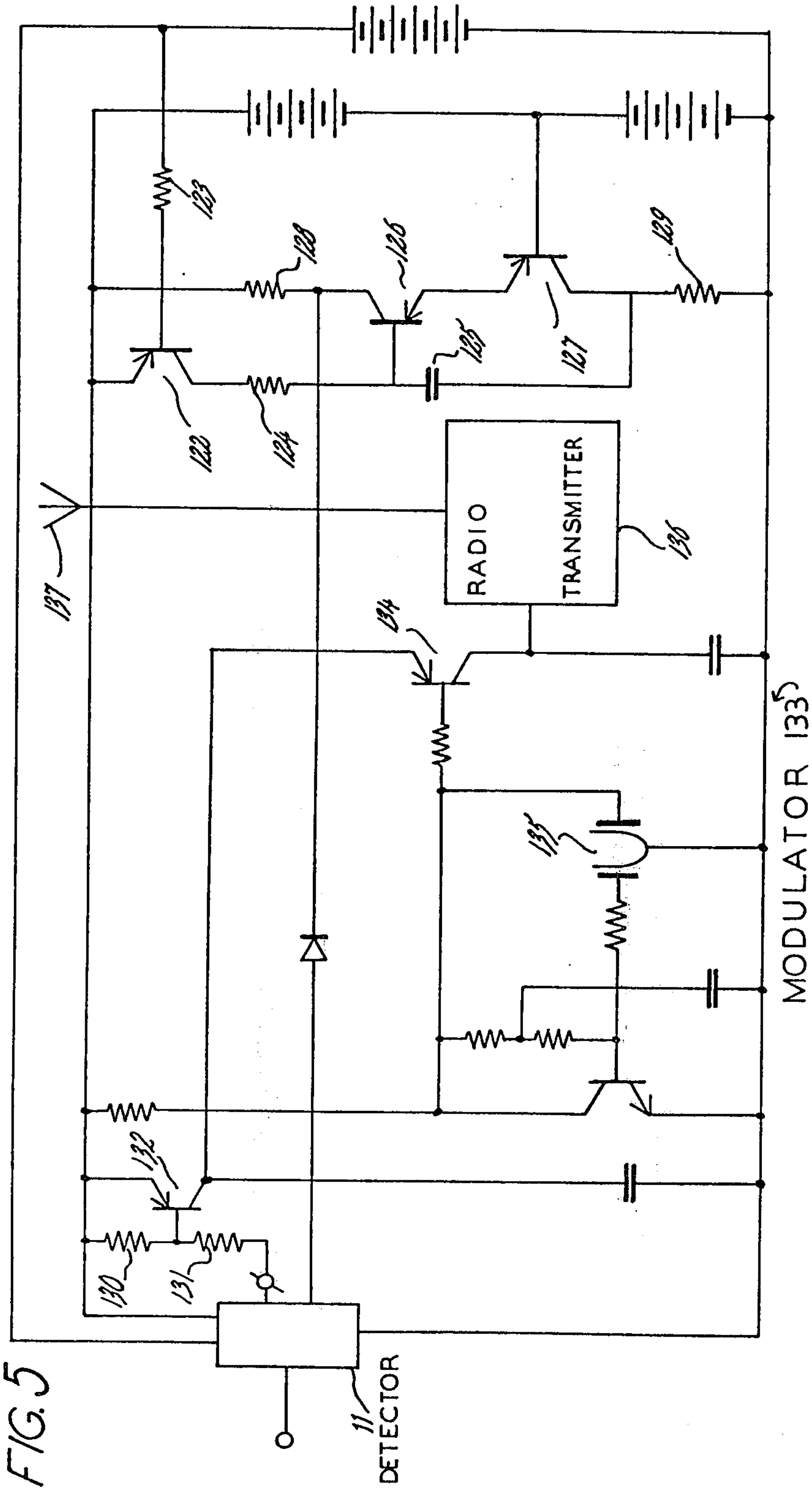
FIG. 5 is a schematic illustration of an alternate embodiment of the invention showing the receiver unit.

As an alternate embodiment of the invention, the output of the detector circuit may be coupled to a radio signal generator, such as is shown in FIG. 5. Referring first to the master timer portion of the circuit, timing capacitor 125 is periodically charged through resistor 124, and transistor 122 and discharged through transistors 126 and 127. Every time the capacitor 125 is being discharged the voltage at junction of transistor 126 and resistor 128 drops and thereby turns transistor 132 momentarily into conduction. Transistor 132 works as a switch and turns on and off power for modulator 133 and transmitter 136. Transistor 122 besides charging the capacitor 125 monitors the state of depletion of the batteries. If the voltage of the main battery falls below a predetermined level the master timer automatically shuts off causing a fault alarm. When this occurs, transistor 132 is turned on, thereby energizing the modulator circuit designated by the numeral 133. The tuning fork oscillator drives the transistor 134 to periodically turn the power supply on and off for the radio transmitter with a frequency equal to the vibrations of the tuning fork 135. This output signal amplitude modulates a radio signal in the radio transmitter 136 which signal is transmitted via antenna 137. Thus, periodically, depending on the charging rate of capacitor 125, radio transmitter 136 generates an output signal via antenna 137. This signal is illustrated in FIG. 8*b*. When, however, smoke is detected, the biasing resistors 130 and 131 are continuously connected with reference ground potential, thus, overriding the master timer. When this occurs, the modulator circuit 133 constantly provides a modulating signal to the radio transmitter 136. Hence, the radio transmitter 136 provides a continuous signal via antenna 137 to a receiver unit, such as is shown in FIG. 6.

Figure 6:
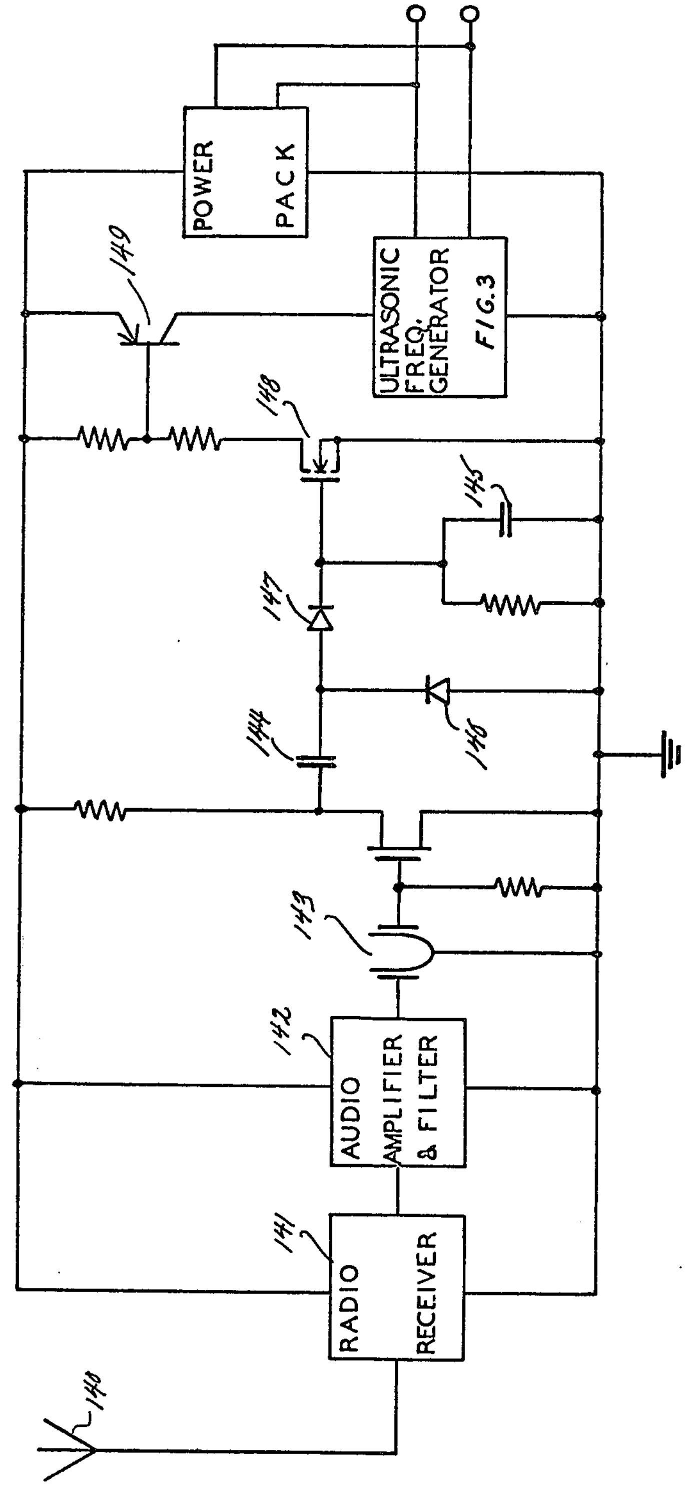
FIG. 6 is an alternate embodiment of the responder unit of the invention showing a radio receiver.

The radio receiver illustrated in FIG. 6 includes a receiver unit 141 which demodulates the input signal received via antenna 140. The output of the radio receiver is illustrated in FIG. 8*c*. This signal is amplified and filtered by amplifier 142 to eliminate the noise signals shown in FIG. 8*c* and to increase the amplitude of the deected signal for further processing. The output of the amplifier 142 is then filtered by means of a band-pass filter including tuning fork 143 and is then rectified by a rectifier circuit comprising capacitors 144 and 145 and diodes 146 and 147. The rectified signal is in the form of a square wave which is illustrated graphically at FIG. 8*d*. This signal drives a field effect transistor 148, the conduction of which causes transistor 149 to conduct. When transistor 149 conducts current, an ultrasonic frequency generator identical to that shown in FIG. 3 is energized to provide an output signal, such as is illustrated at FIG. 8*e*. This signal is then coupled to the Schmidt trigger illustrated in FIG. 4 which processes the signal as aforementioned in connection with the description of the circuit illustrated in FIG. 4.

While the preferred embodiment of the invention has been shown and described, it will be understood that the invention may be embodied otherwise than as herein illustrated and described and that certain changes in the form and the arrangement of the parts and in the specific manner of practicing the invention may be made without departing from the spirit of the invention as defined by the appended claims.

The embodiments of the invention in which an exclusive property or privilege is claimed are defined as follows:

1. A smoke detector comprising a detector circuit including a first chamber having first and second electrodes, and a radioactive element in spaced relationship to said electrodes, said radioactive element ionizing the gas in said chamber, said first chamber being permeable both to particles to be detected and other variations in the ambient atmospheric conditions surrounding said first chamber; a second chamber having first and second electrodes, and a radioactive element in spaced relationship to said electrodes, said radioactive element ionizing the gas in said chamber, said second chamber being substantially impermeable to said particles to be detected but being permeable to said other variations in the ambient atmospheric conditions thereabout, said chambers being connected in series with an electrode of said first chamber being connected to an electrode of said second chamber; means for conducting an electric current through said chambers; and means for detecting when the resistance of said first chamber varies with respect to the resistance of said second chamber by at least a threshold amount and for providing a detector signal when smoke having a predetermined particle density is detected by said first chamber; means for generating a signal having constant duration and periodicity; means responsive to said detector signal for varying the duration and periodicity of said generated signal; and means arranged to receive said generated signal from said generating means and to produce an alarm signal if the time between successive ones of said generated signals is outside a predetermined range.

2. The smoke detector of claim 1 further comprising means for varying the threshold detecting level of smoke density in said first chamber.

3. The smoke detector of claim 2 wherein said detecting means comprises a MOS-FET transistor having its gate terminal connected to the common electrodes of said first and second chambers, said MOS-FET being biased to conduct current from the drain to the source terminal thereof when the resistance of said first chamber varies with respect to the resistance of the second chamber by at least said threshold amount.

4. The smoke detector of claim 2 further comprising means for generating a high-frequency signal having a predetermined period and duration, means for connecting said output indication means to said high-frequency signal generating means, means for varying the duration of said high-frequency signal when said predetermined density of smoke is detected by said first chamber, means for modulating a radio frequency signal by said high-frequency signal, means for transmitting said radio frequency signal, means for receiving said radio frequency signal, means for demodulating said radio frequency signal, and means for generating an alarm indicator signal when said received high-frequency signal has a duration greater than a predetermined period.

5. The smoke detector of claim 4 further comprising means for inhibiting said high-frequency signal when a fault is detected in said means for connecting said output indicator means to said high-frequency signal generating means, means for determining when said high-frequency generator has not generated a signal for a predetermined period of time, and means for energizing a fault indicator when said high-frequency signal generator has not generated a signal for said predetermined period of time.

6. An emergency alarm system including detector means responsive to a condition and providing a detector signal indicative of the presence or absence of said condition, means for generating a signal having constant duration and periodicity, means responsive to said detector signal when indicating the presence of said condition to vary the duration and periodicity of said generated signal, and means arranged to receive said generated signal from said generating means and to produce an alarm signal if the time between successive ones of said generated signals is outside a predetermined range.

7. The smoke detector of claim 1 further comprising means for generating a high-frequency signal having a duration and periodicity substantially similar to the duration and periodicity of said generated signal as determined by the presence or absence of said detector signal; means for transmitting said high-frequency signal over a communications channel; and means for generating an alarm indicator signal when the time between successive ones of said high-frequency signals is outside said predetermined range.

8. The smoke detector of claim 7 further comprising means for inhibiting transmission of said high-frequency signal when a fault is present in said detector circuit; means for determining when said high-frequency generator has not generated a signal for a predetermined period of time; and means for energizing a fault indicator when said high-frequency generator has not generated a signal for said predetermined period of time.

* * * * *